(12) United States Patent
Fan et al.

(10) Patent No.: US 8,565,182 B2
(45) Date of Patent: *Oct. 22, 2013

(54) METHOD AND APPARATUS FOR FEEDING BACK AND RECEIVING ACKNOWLEDGEMENT INFORMATION OF SEMI-PERSISTENT SCHEDULING DATA PACKETS

(71) Applicant: Huawei Technologies Co., Ltd., Guangdong (CN)

(72) Inventors: Xiaoan Fan, Beijing (CN); Guang Liu, Shenzhen (CN); Bo Li, Beijing (CN); Yunzhe Hou, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/720,915

(22) Filed: Dec. 19, 2012

(65) Prior Publication Data

US 2013/0107842 A1    May 2, 2013

Related U.S. Application Data

(63) Continuation of application No. 13/094,697, filed on Apr. 26, 2011, now Pat. No. 8,358,621, which is a continuation of application No. 12/610,618, filed on Nov. 2, 2009, now Pat. No. 8,249,010, which is a continuation of application No. PCT/CN2009/071486, filed on Apr. 27, 2009.

(30) Foreign Application Priority Data

Nov. 5, 2008 (CN) .......................... 2008 1 0217254

(51) Int. Cl.
*H04W 4/00* (2009.01)
*H04J 3/00* (2006.01)
*H04W 72/00* (2009.01)
*H04L 1/18* (2006.01)
*H04H 20/71* (2008.01)

(52) U.S. Cl.
USPC ........ 370/329; 370/395.4; 370/498; 455/450; 714/749

(58) Field of Classification Search
USPC .................... 370/203–210, 230.1, 242, 280, 370/310–352, 395.4, 395.41, 412, 400, 480, 370/482, 498, 522; 455/450–454, 464, 550; 714/749–764; 375/233, 375/240.04–240.07, 252, 260, 343, 354, 375/358, 364

See application file for complete search history.

(56) References Cited

U.S. PATENT DOCUMENTS

| | | |
|---|---|---|
| 6,967,940 B2 | 11/2005 | Marinier et al. |
| 7,373,148 B2 | 5/2008 | Kim et al. |
| 7,493,117 B2 | 2/2009 | Cai |
| 7,912,007 B2 | 3/2011 | Fan et al. |
| 7,979,784 B2 | 7/2011 | Shao et al. |
| 8,249,010 B2* | 8/2012 | Fan et al. ...................... 370/329 |
| 8,358,621 B2* | 1/2013 | Fan et al. ...................... 370/329 |
| 2004/0202140 A1 | 10/2004 | Kim et al. |
| 2006/0252439 A1 | 11/2006 | Cai |
| 2006/0256758 A1 | 11/2006 | Malkamaki et al. |
| 2007/0147333 A1 | 6/2007 | Makhijani |
| 2008/0009262 A1 | 1/2008 | Rudolf et al. |
| 2008/0175195 A1 | 7/2008 | Cho et al. |
| 2008/0192674 A1 | 8/2008 | Wang et al. |
| 2008/0273513 A1 | 11/2008 | Montojo et al. |
| 2009/0257408 A1 | 10/2009 | Zhang et al. |
| 2009/0290538 A1 | 11/2009 | Kim et al. |
| 2010/0004005 A1 | 1/2010 | Kim |
| 2010/0027446 A1 | 2/2010 | Choi |
| 2010/0027447 A1 | 2/2010 | Choi et al. |
| 2010/0034158 A1 | 2/2010 | Meylan |
| 2010/0210256 A1 | 8/2010 | Shen et al. |
| 2010/0260135 A1 | 10/2010 | Fan et al. |

FOREIGN PATENT DOCUMENTS

| | | |
|---|---|---|
| CN | 1551677 A | 12/2004 |
| CN | 1669232 A | 9/2005 |
| CN | 101114868 A | 1/2008 |
| CN | 101167313 A | 4/2008 |

| | | |
|---|---|---|
| CN | 101212251 A | 7/2008 |
| CN | 101296061 A | 10/2008 |
| CN | 101340442 A | 1/2009 |
| CN | 101499882 A | 8/2009 |
| KR | 20080092222 A | 10/2008 |
| WO | 2004100590 A1 | 11/2004 |
| WO | 2007072341 A2 | 6/2007 |
| WO | 2008127015 A1 | 10/2008 |

OTHER PUBLICATIONS

Huawei et al:"Remaining Issues of ACK/NAK Multiplexing on PUSCH", 3GPP TSG-RAN-WG1 Meeting #55, R1-084344, dated Nov. 10-14, 2008, total 4 pages.
Brian Claason :"Huawei LTE and LET-A contributions for RAN1 #55", XP-002636808, dated Nov. 2008, total 4 pages.
Huawei et al:"Implict mapping between CCE and PUCCH for ACK/NACK TDD", R1-082359, 3GPP TSG-RAN-WG1 Meeting #53bis, dated Jun. 30-Jul. 4, 2008, total 4 pages.
Kim Hak Seong et al. U.S. Appl. No. 61/090,610, entitled "Shorened SR and Related UL Configuratins", filed Aug. 20, 2008, total 11 pages.
Search report issued in corresponding European application No. 09733661.4, dated May 31, 2011, total 9 pages.
First office action issued in corresponding European patent application No. 09733661.4, dated Mar. 13, 2012, total 8 pages.
Derk Visser:"The Annotated European Patent Convention", 2007, vol. 2007, pp. 82-83, total 4 pages.
Office Action in corresponding Japanese patent application No. 2010536315, dated Jan. 10, 2012,and English translation thereof, total 4 pages.
CMCC et al:"Channel Models for LTE-Advanced Evaluations", TSG-RAN WG1#55 R1-084334, dated Nov. 10-14, 2008, total 3 pages.
Second office action issued in corresponding Korean patent application No. 10-2010-7012083, dated Nov. 7, 2011,and English translation thereof, total 4 pages.
First office action issued in corresponding Korean patent application No. 10-2010-7012083, dated Jun. 22, 2011,and English translation thereof, total 5 pages.
Catt et al:"Way Foward on Remaining Issues for TDD ACK/NAK Transmission on PUSCH", 3GPP TSG RAN WG1 Meeting #54bis R1-084059, dated Sep. 29-Oct 3, 2008, total 3 pages.
Written Opinion issued in corresponding PCT application No. PCT/CN2009/071486, dated Aug. 13, 2009, total 3 pages.
International Search report issued in corresponding PCT application No. PCT/CN2009/071486, dated Aug. 13, 2009, total 4 pages.
3GPP TS 36.213 V8.4.0:"3rd Generation Partnership Project; Technical Specification Group Radio Access Network; Evolved Universal Terrestrial Radio Access (E-UTRA);Physical layer procedures(Release 8)", dated Sep. 2008, total 60 pages.
First office action issued in corresponding U.S. Appl. No. 12/610,618, dated Dec. 21, 2011, total 22 pages.
First office action issued in corresponding U.S. Appl. No. 12/830,246, dated Sep. 1, 2010, total 24 pages.
First office action issued in corresponding U.S. Appl. No. 13/094,697, dated Jul. 28, 2011, total 21 pages.
Second office action issued in corresponding U.S. Appl. No. 13/094,697, dated Oct. 21, 2011, 2010, total 15 pages.
Front Page corresponding granted Chinese Patent No. CN 102136895B (Application No. 201110094816.1) citing prior art at Item (56), issued Nov. 7, 2012, 1 page only.
Wang Haiming et al. U.S. Appl. No. 60/889,148, entitled "Method and Apparatus for Acknowledgement Signaling", filed Feb. 9, 2007, total 35 pages.
Kim Hak Seong et al. U.S. Appl. No. 61/046,777, entitled "New PUCCH Index Generation", filed Apr. 21, 2008, total 15 pages.
Kim Hak Seong et al. U.S. Appl. No. 61/073,034, entitled "Correction of PUCCH Index Generation", filed Jun. 17, 2008, total 22 pages.
Kim Hak Seong et al. U.S. Appl. No. 61/088,343, entitled "Shorened Scheduling Request", filed Aug. 12, 2008, total 10 pages.
Oral proceedings issued in corresponding to EP application No. 09733661.4,dated Jan. 25, 2013,total 4 pages.

* cited by examiner

*Primary Examiner* — Habte Mered
(74) *Attorney, Agent, or Firm* — Huawei Technologies Co., Ltd

(57) ABSTRACT

The application relates to radio communications and discloses a method and apparatus for feeding back and receiving acknowledgment (ACK) information of semi-persistent scheduling (SPS) data packets. The method includes receiving downlink data packets and an uplink data assignment indicator (UL DAI) from a base station (BS), wherein a value of the UL DAI indicates a number (N) of all scheduled downlink sub-frames which scheduled by the BS for the UE, the number N is greater than 1, and a number k (k<N) of the downlink data packets is/are semi-persistent scheduling (SPS) data packets; forming a feedback signal comprising N acknowledgements/negative acknowledgements (ACKs/NAKs) acknowledging the N downlink data packets, k ACKs/NAKs of the k SPS data packets is/are placed from (N−k+1)th to Nth positions of the N ACKs/NAKs; and sending the feedback signal to the BS starting from the ACK/NAK at the first position.

30 Claims, 8 Drawing Sheets

METHOD AND APPARATUS FOR FEEDING BACK AND RECEIVING ACKNOWLEDGEMENT INFORMATION OF SEMI-PERSISTENT SCHEDULING DATA PACKETS

CROSS-REFERENCE TO RELATED APPLICATIONS

This application is a continuation of U.S. patent application Ser. No. 13/094,697, filed on Apr. 26, 2011. The U.S. patent application Ser. No. 13/094,697 is a continuation of U.S. patent application Ser. No. 12/610,618, filed on Nov. 2, 2009, now U.S. Pat. No. 8,249,010. The U.S. patent application Ser. No. 12/610,618 is a continuation of International Application No. PCT/CN2009/071486, filed on Apr. 27, 2009. The International Application No. PCT/CN2009/071486 claims priority to Chinese Patent Application No. 200810217254.3, filed on Nov. 5, 2008. All of the aforementioned patent applications are hereby incorporated by reference in their entireties.

TECHNICAL FIELD

The disclosure relates to radio communications, and in particular, to a method and apparatus for feeding back and receiving acknowledgement information of semi-persistent scheduling data packets.

BACKGROUND

Two modes are supported in the 3GPP E-UTRA (Third Generation Partnership Project-Evolved Universal Terrestrial Radio Access) system: a frequency division duplexing (FDD) mode and a time division duplexing (TDD) mode. In the TDD mode, the length of each radio frame is 10 milliseconds (ms) and the radio frame is composed by two 5 ms length half-frames. Each half-frame is composed by eight 0.5 ms timeslots and three special fields, namely, a downlink pilot timeslot (DwPTS), a guard period (GP) and an uplink pilot timeslot (UpPTS). Two timeslots form a sub-frame, and the DwPTS, GP, and UpPTS form a special sub-frame. The length of the sub-frame is 1 ms.

Currently, two modes are available for feeding back an acknowledgement or negative acknowledgement (ACK/NAK) of multiple downlink sub-frames in an uplink sub-frame in the 3GPP E-UTRA system: multiplexing mode and bundling mode. In the multiplexing mode, if a feedback occurs in a physical uplink control channel (PUCCH), the feedback is related to an uplink-downlink configuration; if the feedback occurs in a physical downlink shared channel (PDSCH), the number of bits fed back depends on whether an uplink grant (UL Grant) signaling exists. If the UL Grant signaling exists, the number of bits that a user equipment (UE) is required to feed back is specified through an uplink data assignment indicator (UL DAI) field in the signaling. For example, if a base station (BS) schedules x of the total N downlink sub-frames, the UE feeds back x ACKs/NAKs; if no UL Grant signaling exists, the UE feeds back N bits and a NAK to those non-scheduled downlink sub-frames.

In the bundling mode, only 1-bit ACK/NAK information is fed back, in the PUCCH or in the PUSCH, to indicate the details of all the scheduled downlink sub-frames. So long as the feedback to a scheduled downlink sub-frame is a NAK, the final feedback is a NAK. The final feedback is an ACK only when feedbacks to all the scheduled downlink sub-frames are ACKs.

Two data scheduling modes are defined in the current Long Term Evolution (LTE) protocol: dynamic scheduling mode and semi-persistent scheduling (SPS) mode, i.e. two types of resource indicators of data transmission. In the dynamic scheduling mode, each new data packet has a control signaling—physical downlink control channel (PDCCH) to indicate resources and transmission mode. The UE receives downlink data and transmits uplink data according to the PDCCH delivered by the base station (BS). In the SPS mode, the BS sends a PDCCH control signaling only when the SPS transmission is activated. The UE activates the SPS transmission according to the position and time indicated by the PDCCH. The UE transmits and receives new data packets in a certain period until another PDCCH in a special format terminates the SPS transmission.

Because the PDCCH is used for notification in both dynamic scheduling and semi-persistent scheduling modes, the UE differentiates whether the scheduling mode is dynamic scheduling or semi-persistent scheduling by different scrambled IDs in a cyclic redundancy check (CRC) of the PDCCH. In the dynamic scheduling mode, the CRC of the PDCCH is scrambled with a cell radio network temporary identifier (C-RNTI); in the semi-persistent scheduling mode, the CRC of the PDCCH is scrambled with a semi-persistent scheduling cell radio network temporary identifier (SPS-C-RNTI). When the UE detects the PDCCH scrambled with the SPS-C-RNTI, the UE activates the semi-persistent transmission, and receives or transmits data according to the indication in the PDCCH. Within the subsequent period of time, the UE receives and transmits data only according to the position indicated by the PDCCH when the semi-persistent transmission is activated for the first time, making it unnecessary to notify the UE of the position of SPS data packet resources through the PDCCH each time. When the position of SPS resources needs to be changed, a new PDCCH may be used to replace the previous semi-persistent scheduling configuration until the semi-persistent transmission is cancelled by a PDCCH scrambled with an SPS-C-RNTI in a special format when the period of SPS data expires.

However, in uplink ACK/NAK multiplexing mode in the prior art, the first position of K ACKs/NAKs fed back by the UE is the ACK/NAK of the SPS sub-frame, and the position of the UL ACK/NAK of other sub-frames is arranged in the sequence of downlink data assignment indicator (DL DAI). If the UE does not detect any data in the sub-frames, the UE feeds back a NAK. When the UE loses the SPS activation signaling, the UE feeds back a NAK at the first position. Based on the NAK, the BS thinks that the control signaling is received properly but data is wrong, thus receiving incorrect ACK information. As a result, the BS does not retransmit a PDCCH, and the UE still does not know the position of the semi-persistent transmission, which causes unnecessary retransmission.

SUMMARY OF THE INVENTION

One objective of embodiments of the present invention is to provide a method and apparatus for feeding back ACK information of SPS data packets so that the ACK information of downlink data can be fed back properly.

Another objective of embodiments of the present invention is to provide a method and apparatus for receiving ACK information of SPS data packets so that the ACK information of downlink data can be received properly.

To achieve the preceding objectives, embodiments of the present invention provide the following technical solutions. A method for feeding back ACK information of SPS data packets includes: receiving downlink data and an uplink data assignment indicator (UL DAI) from a base station (BS), where a value of the UL DAI indicates a number (N) of downlink data packets; placing ACKs/NAKs of k SPS data packets of the downlink data packets at positions from a $(N-k+1)^{th}$ ACK/NAK to a $N^{th}$ ACK/NAK; and feeding back N ACKs/NAKs to the BS.

A method for receiving ACK information of SPS data packets includes: sending downlink data and an uplink data assignment indicator (UL DAI) to a user equipment (UE), where a value of the UL DAI indicates a number (N) of downlink data packets; and receiving N ACKs/NAKs fed back sent from the UE, among which positions from a $(N-k+1)^{th}$ ACK/NAK to a $N^{th}$ ACK/NAK is/are used for placing k SPS data packets of the downlink data packets.

An apparatus for feeding back ACK information of SPS data packets includes: a receiving unit configured to receive downlink data and an uplink data assignment indicator (UL DAI) from a base station (BS), wherein a value of the UL DAI indicates a number (N) of downlink data packets; a processing unit configured to place ACKs/NAKs of k SPS data packets of the downlink data packets at positions from a $(N-k+1)^{th}$ ACK/NAK to a $N^{th}$ ACK/NAK; and a feedback unit configured to feed back N ACKs/NAKs to the BS.

An apparatus for receiving ACK information of SPS data packets includes: a sending unit configured to send downlink data and an uplink data assignment indicator (UL DAI) to a user equipment (UE), wherein a value of the UL DAI indicates a number (N) of downlink data packets; and a receiving unit configured to receive N ACKs/NAKs fed back by the UE, among which positions from a $(N-k+1)^{th}$ ACK/NAK to a $N^{th}$ ACK/NAK is/are used for placing k SPS data packets of the downlink data packets.

Compared with the prior art, embodiments of the present invention have the following differences and benefits. The ACKs/NAKs of k SPS data packets of the downlink data packets are placed to positions from the $(N-k+1)^{th}$ ACK/NAK to the $N^{th}$ ACK/NAK. In this case, when the SPS activation PDCCH signaling or the override PDCCH signaling of the SPS sub-frames is missing, the UE cannot differentiate whether the sub-frames are dynamic scheduling sub-frames or SPS sub-frames. If the ACKs/NAKs of the SPS data packets of the downlink data packets are placed at the $N^{th}$ ACK/NAK for feedback, N ACKs/NAKs can be arranged correctly. Furthermore, when the BS receives the ACK information of N ACKs/NAKs that are arranged correctly, unnecessary data retransmissions may be reduced, thus saving resources.

DETAILED DESCRIPTION

For better understanding of the objectives, technical solutions and merits of the present invention, the following describes the present invention in detail with reference to the accompanying drawings and exemplary embodiments.

Figure 1:
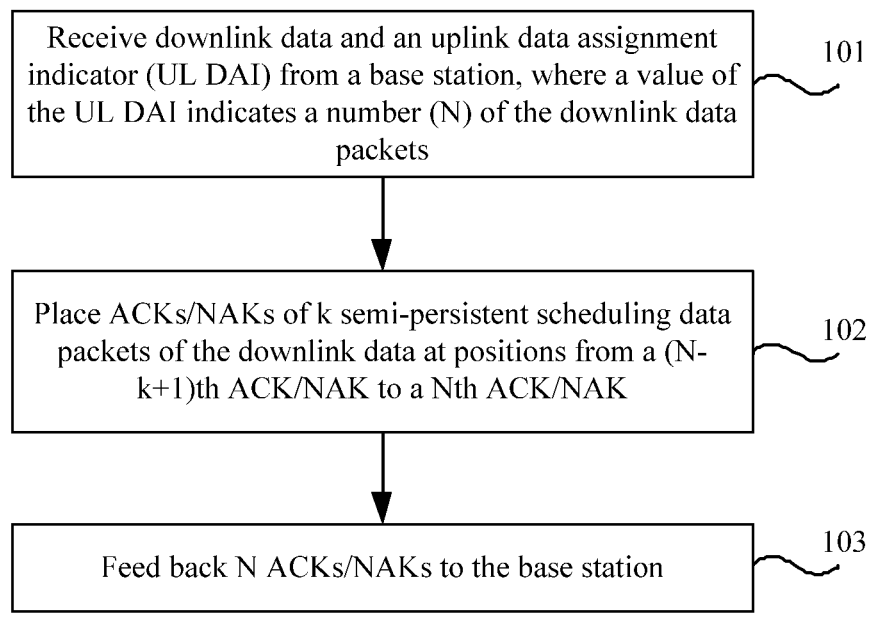
FIG. 1 is a flowchart of a method for feeding back ACK information of SPS data packets according to an embodiment of the present invention.

FIG. 1 is a flowchart of a method for feeding back ACK information of SPS data packets according to an embodiment of the present invention. As shown in FIG. 1, the method includes the following steps.

Step 101: Receive downlink data and an uplink data assignment indicator (UL DAI) from a base station (BS), where a value of the UL DAI indicates a number (N) of the downlink data packets.

Step 102: Place ACKs/NAKs of k semi-persistent scheduling data packets of the downlink data packets at positions from a $(N-k+1)^{th}$ ACK/NAK to a $N^{th}$ ACK/NAK, where k is a positive integer greater than 0.

Step 103: Feed back N ACKs/NAKs to the base station.

The placing the ACKs/NAKs of the k semi-persistent scheduling data packets of the downlink data at the positions from the $(N-k+1)^{th}$ ACK/NAK to the $N^{th}$ ACK/NAK of step 102 includes: placing the ACKs/NAKs of the k semi-persistent scheduling data packets of the downlink data at the positions from the $(N-k+1)^{th}$ ACK/NAK to the $N^{th}$ ACK/NAK in positive or negative sequence.

Step 102 further includes: placing ACKs/NAKs of non-semi-persistent scheduling data packets of the downlink data at positions from a first ACK/NAK among the N ACKs/NAKs. Specifically, the step includes: receiving a downlink data assignment indicator (DL DAI) from the base station, where a value of the DL DAI indicates that a downlink data packet is an $M^{th}$ non-semi-persistent scheduling data packet of the downlink data packets; and placing a ACK/NAK of the $M^{th}$ non-semi-persistent scheduling data packet at position of a $M^{th}$ ACK/NAK.

In this embodiment, the ACKs/NAKs of the k semi-persistent scheduling data packets of the downlink data are placed to the positions from the $(N-k+1)^{th}$ ACK/NAK to the Nth ACK/NAK. In this case, when the semi-persistent scheduling activation PDCCH signaling or the override PDCCH signaling of the semi-persistent scheduling sub-frames is missing, the UE cannot differentiate whether the sub-frames are dynamic scheduling sub-frames or semi-persistent scheduling sub-frames. If the ACKs/NAKs of the k semi-persistent scheduling data packets of the downlink data are placed at the positions from the $(N-k+1)^{th}$ ACK/NAK to the Nth ACK/NAK, the N ACKs/NAKs can be arranged correctly.

Figure 2:
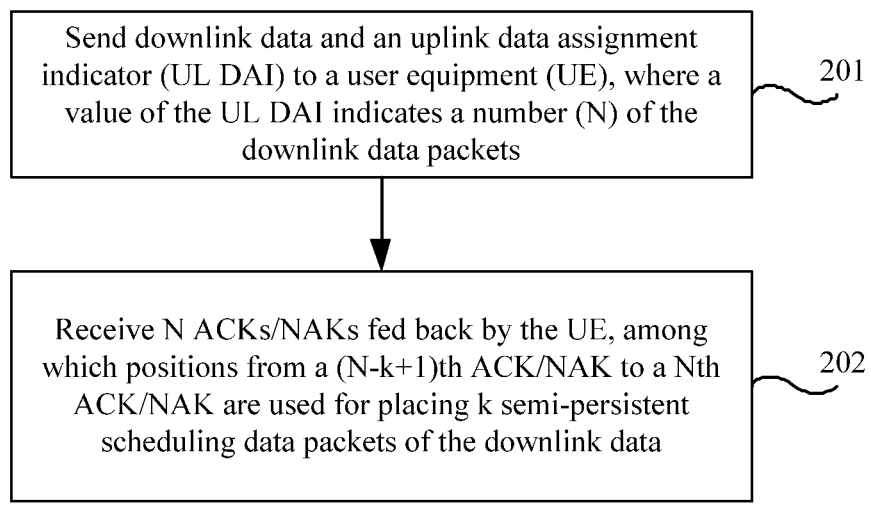
FIG. 2 is a flowchart of a method for receiving ACK information of SPS data packets according to an embodiment of the present invention.

FIG. 2 is a flowchart of a method for receiving ACK information of SPS data packets in an embodiment of the present invention. As shown in FIG. 2, the method includes the following steps.

Step 201: Send downlink data and an uplink data assignment indicator (UL DAI) to a user equipment (UE), where a value of the UL DAI indicates a number (N) of the downlink data packets.

Step 202: Receive N ACKs/NAKs fed back by the UE, among which positions from a $(N-k+1)^{th}$ ACK/NAK to a $N^{th}$ ACK/NAK are used for placing k semi-persistent scheduling data packets of the downlink data packets.

When the base station receives a feedback i.e. NAK, responding to the semi-persistent scheduling activation sub-frame, another semi-persistent scheduling activation signaling is transmitted at a next time of semi-persistent transmission or at time of semi-persistent scheduling retransmission. The transmitted signaling is the same as or different from the semi-persistent scheduling activation signaling.

The step of placing the ACKs/NAKs of the non-SPS data packets of the downlink data packets to the positions from the first ACK/NAK among the N ACKs/NAKs in step 202 includes sending a downlink data assignment indicator (DL DAI) to the UE, where a value of the DL DAI indicates that the downlink data packet is a $M^{th}$ non-SPS data packet of the downlink data packets, and receiving M ACKs/NAKs from the UE, among which the ACK/NAK of the $M^{th}$ non-SPS data packet is placed at the position of a $M^{th}$ ACK/NAK.

The ACKs/NAKs of k SPS data packets of the downlink data packets are placed to the positions from the $(N-k+1)^{th}$ ACK/NAK to the $N^{th}$ ACK/NAK. In this case, when the SPS activation PDCCH signaling or the override PDCCH signaling of the SPS sub-frames is missing, the UE cannot differentiate whether the sub-frames are dynamic scheduling sub-frames or SPS sub-frames. If the ACKs/NAKs of k SPS data packets of the downlink data packets are placed to positions from the $(N-k+1)^{th}$ ACK/NAK to the $N^{th}$ ACK/NAK, the N ACKs/NAKs can be arranged correctly. Thus, when the BS receives the N ACKs/NAKs that are arranged correctly, unnecessary data retransmissions may be reduced, thus saving resources. The preceding embodiment is based on the TDD mode. The TDD mode has the following features: Sub-frames 0 and 5 must be downlink sub-frames; sub-frame 2 must be an uplink sub-frame; the DwPTS may transmit downlink data or not transmit data; the rest of sub-frames may be assigned as uplink or downlink sub-frames flexibly.

TABLE 1

Assignment ratio of uplink sub-frames to downlink sub-frames in the TDD system

| Uplink-downlink sub-frames | Sub-Frame No. | | | | | | | | | |
|---|---|---|---|---|---|---|---|---|---|---|
| Assignment ratio | 0 | 1 | 2 | 3 | 4 | 5 | 6 | 7 | 8 | 9 |
| 3:1 (5 ms) | D | S | U | U | U | D | S | U | U | U |
| 2:2 (5 ms) | D | S | U | U | D | D | S | U | U | D |
| 1:3 (5 ms) | D | S | U | D | D | D | S | U | D | D |
| 3:6 (10 ms) | D | S | U | U | U | D | D | D | D | D |
| 2:7 (10 ms) | D | S | U | U | D | D | D | D | D | D |
| 1:8 (10 ms) | D | S | U | D | D | D | D | D | D | D |
| 5:3 (10 ms) | D | S | U | U | U | D | S | U | U | D |

As shown in Table 1, seven uplink-to-downlink assignment ratios are defined in the 3GPP E-UTRA system, including three assignment ratios for the period of 5 ms, namely, 1:3, 2:2 and 3:1, and four assignment ratios for the period of 10 ms, namely, 6:3, 7:2, 8:1 and 3:5. Except the assignment ratios of 1:3 and 3:5, the assignment ratios may cause the following result: ACKs/NAKs of N (greater than 1) downlink sub-frames need to be fed back in an uplink sub-frame.

Taking the assignment ratio of 2:2 as an example, when the DwPTS transmits downlink data, the ACK/NAK feedbacks to the downlink sub-frames should be assigned to the downlink sub-frames evenly. Thus, one of two uplink sub-frames must feed back ACKs/NAKs of two downlink sub-frames. These N downlink sub-frames may be dynamic scheduling sub-frames or SPS sub-frames. The BS may schedule one or multiple downlink sub-frames of N downlink sub-frames. For example, it may schedule only one downlink sub-frame or all of the N downlink sub-frames, which is determined by the scheduler of the BS according to services. The dynamic scheduling is random scheduling, in which only one downlink sub-frame can be scheduled once. The BS may dynamically schedule any downlink sub-frame. A PDCCH is required in the dynamic scheduling of each downlink sub-frame. The SPS is a mode in which multiple downlink sub-frames are scheduled by period. Except that a PDCCH is required in the SPS of the first downlink sub-frame, no PDCCH is required in the subsequent SPS of downlink sub-frames.

The 3GPP LTE technology defines a series of requirements to avoid HARQ interaction errors. The requirements are as follows.

1. A 2-bit UL DAI is used in the UL Grant to indicate the number of scheduled PDSCH sub-frames of the UE. The PDSCH sub-frames include dynamic sub-frames and SPS sub-frames. In certain cases, for example, to determine the number of SPS sub-frames, the value of the UL DAI may include the number of non-SPS sub-frames only. In these cases, the UE obtains the number (N) of PDSCH sub-frames by counting the sum of the number of SPS sub-frames and the number of non-SPS sub-frames indicated by the UL DAI, where N indicates the number of uplink ACKs/NAKs that the UE needs to feed back.

2. A 2-bit DL DAI is used in the DL Grant to indicate the current number of PDSCH sub-frames assigned to the UE. In ACK/NAK multiplexing mode, the DL DAI counts only the number of PDSCH sub-frames assigned to the UE until the current time by using a counter, without counting the number of SPS sub-frames. The SPS sub-frames may be sub-frames that carry downlink SPS data without resource scheduling index signaling or sub-frames that carry downlink SPS data and SPS override PDCCH. The SPS sub-frames may also be sub-frames that carry downlink SPS data and include sub-frames carrying the SPS activation signaling PDCCH and sub-frames of the SPS override PDCCH.

3. In uplink ACK/NAK multiplexing mode, the first position among N ACKs/NAKs fed back by the UE is the ACK/NAK of the SPS sub-frame. The UL ACKs/NAKs of other sub-frames are arranged according to the sequence of the DL DAI.

4. If the UE does not detect any data in the sub-frames, the UE feeds back a NAK.

In uplink ACK/NAK multiplexing mode in the prior art, the first position of N ACKs/NAKs that the UE feeds back according to the UL DAI is the ACK/NAK of the SPS sub-frame. The ACKs/NAKs of other sub-frames are arranged according to the sequence of the DL DAI. If the UE does not detect any data in the sub-frames, the UE feeds back a NAK. Thus, when the SPS activation PDCCH is missing, errors may occur in UL ACK/NAK multiplexing feedback because the UE cannot differentiate whether the sub-frame is a dynamic sub-frame or an SPS sub-frame.

Figure 3:
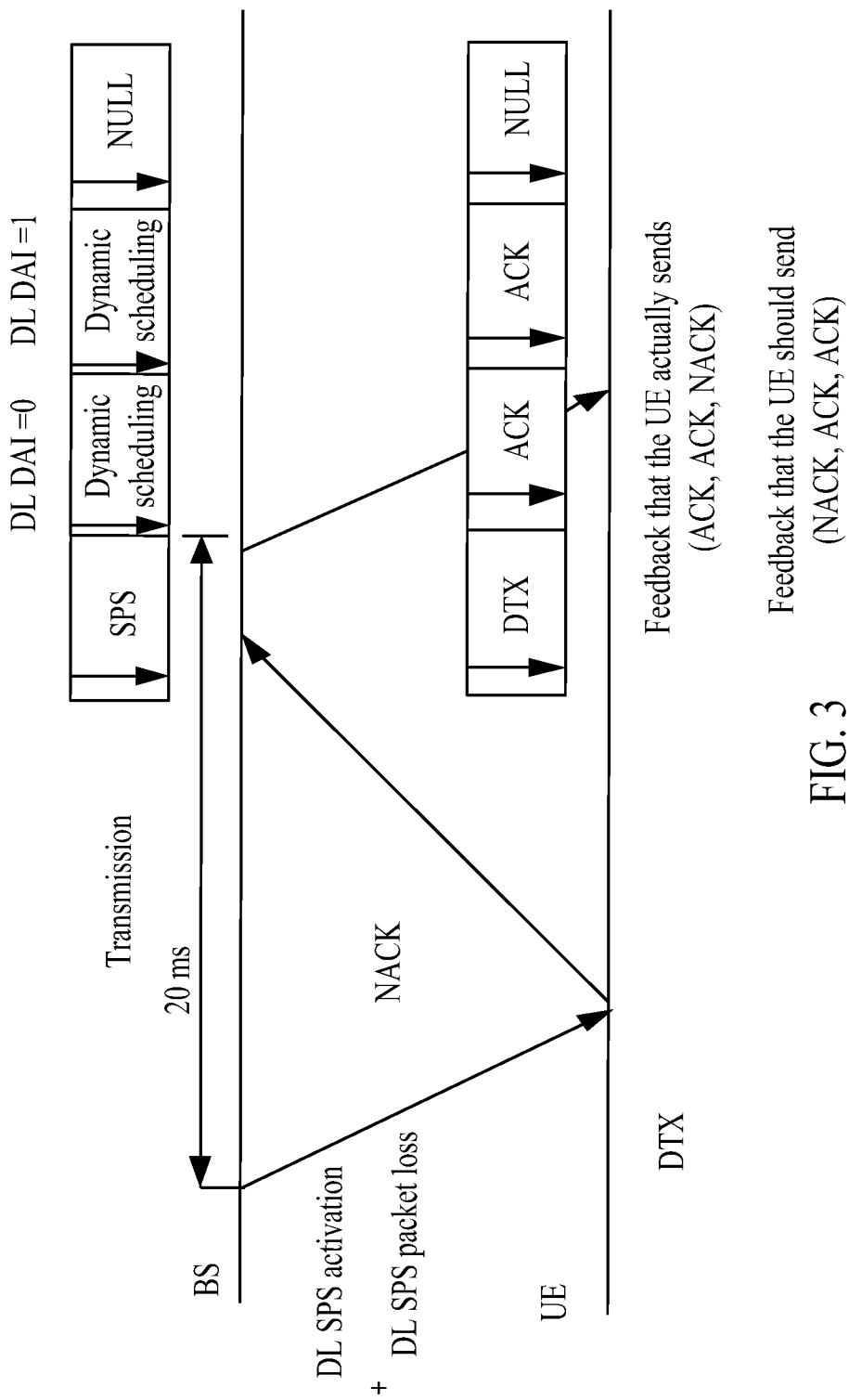
FIG. 3 is a schematic drawing illustrating the receiving of SPS sub-frames in a method for receiving ACK information of SPS data packets according to another embodiment of the present invention.

FIG. 3 is a schematic drawing illustrating the receiving of SPS sub-frames in a method for receiving ACK information of SPS data packets in another embodiment of the present invention. As shown in FIG. 3, the SPS transmission is activated by the downlink resource assignment (DL Grant) signaling. The frequency resources indicated by the DL Grant carry semi-persistent transmission data packets. If the UE does not receive the DL Grant signaling, it should feed back DTX, which means no data is received, but the UE actually feeds back a NAK. The BS does not determine whether the NAK indicates the UE does not receive the DL Grant signaling or whether it indicates the UE receives the DL Grant signaling but errors occurred during the detection of SPS data packets. If the BS believes that the NAK indicates that the UE receives the DL Grant signaling, it thinks that the SPS resources are already activated, and sends new SPS data packets after a certain period. Because the DL Grant is unavailable in SPS mode, the UE cannot obtain correct SPS data within a certain period. As shown in Table 1, supposing when the BS retransmits SPS data packets, the assignment ratio of uplink sub-frames to downlink sub-frames is 1:3, the first sub-frame carries semi-persistent data packets and the second and third sub-frames are dynamic scheduling sub-frames. Based on prior art, the values of the DL DAIs in the DL Grants of the second and third sub-frames should be 0 and 1, and the value of the DAI in the UL Grant of the uplink sub-frame is 3. When the UE receives the four downlink sub-frames, supposing the second sub-frame is received correctly, the third sub-frame is also received correctly. When the UE sends feedback in the uplink, it does not think that the first sub-frame is an SPS sub-frame because the DAI of the UL Grant is 3, the DL DAI of the DL Grant of the received second sub-frame is 0, and the UE does not receive PDCCH of the SPS activation frame. This is caused by the requirement in the prior art that the ACK/NAK of the SPS sub-frame must be fixed at the first position of the multiplexing group. Thus, the UE feeds back an ACK, an ACK and a NAK, but the BS expects the UE to feed back a NAK, an ACK, and an ACK. This is caused by the difference between judgments of the BS and the UE about whether the first sub-frame is an SPS sub-frame. Further, the UE does not receive the SPS activation signaling, but the BS thinks that the UE receives the SPS activation signaling. As a result, the UE feeds back a NAK responding to the SPS data packets within the SPS duration, and the BS does not retransmit the PDCCH. Thus, the UE does not know the position of the semi-persistent transmission, which causes unnecessary retransmissions.

This embodiment provides an improved solution for overcoming the weaknesses of the prior art, in which when the BS retransmits SPS data packets, the assignment ratio of uplink sub-frames to downlink sub-frames is 1:3; and feedback errors occur when the ACKs/NAKs of the SPS sub-frames must be fixed at the first position of the multiplexing group (N ACKs/NAKs). The improved solution is as follows. When the UL ACK/NAK multiplexing is performed on the uplink ACK/NAK associated with the SPS downlink sub-frame, the uplink ACK/NAK is fixed at the last position in the multiplexing group (N ACKs/NAKs) for transmission.

If the DwPTS can also carry downlink data, four downlink sub-frames and one uplink sub-frame are available within 5 ms. If three downlink sub-frames are scheduled for one user equipment, the first one of these three downlink sub-frames is an SPS sub-frame and the second and third downlink sub-frames carry downlink dynamic scheduling data. In this case, the UL DAI may count the total number of scheduled downlink sub-frames of the user equipment. A value of the UL DAI is equal to 3. Because the first downlink sub-frame is the SPS sub-frame, the number of the SPS subframes does not be counted in to the DL DAI parameter. The second downlink sub-frame is the dynamic scheduling data, a value of the DL DAI is equal to 0. The third downlink sub-frame is also a dynamic scheduling data sub-frame, a value of the DL DAI is equal to 1. If the UE loses the semi-persistent transmission data packet (downlink sub-frame 1) and activation DL Grant of the semi-persistent transmission but receives dynamic scheduling data of other sub-frames, the UE cannot know that the first downlink sub-frame is an SPS sub-frame. The UE determines that three UL ACKs/NAKs need to be fed back based on the fact that the UL DAI is equal to 3. Because the DL DAI of the second downlink sub-frame is equal to 0, the UE may misunderstand that the second downlink sub-frame is a first downlink sub-frame scheduled by the BS, and then feed back an ACK at a first position in the multiplexing group (i.e. N ACKs/NAKs). According to the fact that the DL DAI is equal to 1 at the third downlink sub-frame, the UE determines that the third downlink sub-frame is a second scheduled downlink sub-frame, and feeds back an ACK at the second position in the multiplexing group (i.e. N ACKs/NAKs). Because no data is detected at a fourth downlink sub-frame, the UE may determine that the fourth downlink sub-frame is the third scheduled sub-frame which is not received, and then feed back a NAK at the third position in the multiplexing group. Thus, the UE feeds back an ACK, an ACK, and a NAK. According to this embodiment, when the UL ACK/NAK multiplexing is performed on the uplink ACK/NAK associated with the SPS downlink sub-frame, the uplink ACK/NAK of the semi-persistent scheduling downlink sub-frames is fixed at the last position in the multiplexing group for transmission. That is, the UE places the ACKs/NAKs of the SPS sub-frame at the third position among the three ACKs/NAKs. Thus, the BS should receive the feedbacks ACK, ACK, and NAK. In this case, the sequence of ACKs/NAKs that the UE sends is the same as that of ACKs/NAKs that the BS should receive.

In addition, in this embodiment, if the BS receives a feedback of a NAK responding to the semi-persistent scheduling activation sub-frame, the BS transmits another PDCCH which is same as a semi-persistent scheduling activation PDCCH in a next period of semi-persistent data transmission, or retransmits a PDCCH which is same as a semi-persistent scheduling activation PDCCH at a position for semi-persistent scheduling sub-frame retransmission. The UE transmits or receives semi-persistent scheduling data according to resources indicated by the PDCCH, and activates the semi-persistent scheduling transmission.

This embodiment places the ACK/NAK of semi-persistent scheduling data packet of the downlink data at the position of the third ACK/NAK for feedback. Thus, when the semi-persistent scheduling activation PDCCH signaling is missing, the UE cannot differentiate whether the sub-frames are dynamic scheduling sub-frames or semi-persistent scheduling sub-frames. If the ACK/NAK of the semi-persistent scheduling data packet of the downlink data is placed at the position of the third ACK/NAK for feedback, the three ACKs/NAKs can be arranged correctly. In addition, this embodiment takes only the assignment ratio of the uplink sub-frames 1:3 as an example. Other six assignment ratios are also applicable to the present invention, and will not be further described.

Furthermore, when the SPS transmission is normally activated, a new DL Grant may be used to replace the previous semi-persistent scheduling configuration when the period of SPS data expires. When a sub-frame of the override PDCCH is counted into the DL DAI and the ACK/NAK associated with the SPS sub-frame needs to be placed at the first position in the ACK/NAK multiplexing group, errors may occur if the PDCCH of the sub-frame is missing.

Figure 4:
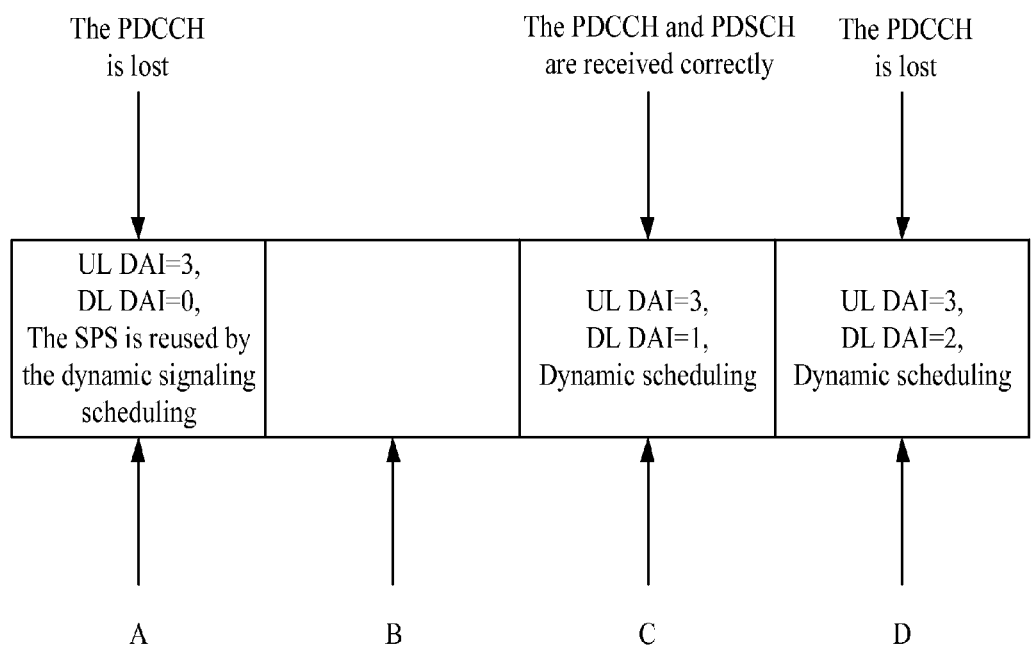
FIG. 4 is a schematic drawing illustrating the receiving of SPS sub-frames in a method for receiving ACK information of SPS data packets according to another embodiment of the present invention.

FIG. 4 is a schematic drawing illustrating the receiving of semi-persistent scheduling sub-frames in a method for receiving acknowledgement information of semi-persistent scheduling data packets in another embodiment of the present invention. As shown in FIG. 4, the BS schedules three downlink sub-frames in a case of the assignment ratio of the uplink sub-frames to the downlink sub-frames is equal to 1:3. In this case, the value of UL DAI is equal to 3. Sub-frame A is an SPS override sub-frame. Thus, the value of DL DAI of the SPS override sub-frame is equal to 0. Sub-frames C and D are dynamic scheduling sub-frames, and their value of DL DAIs are respectively equal to 1 and 2. When the SPS override PDCCH occurs at the sub-frame A, only sub-frame C can be received if the PDCCHs of sub-frame A and D are missing. In this case, the UE knows that the value of the UL DAI of sub-frame C is equal to 3 and the value of the DL DAI of sub-frame C is equal to 1. However, the UE does not know that sub-frame A is an SPS override sub-frame. Instead, the UE thinks that sub-frame A is still an SPS sub-frame that is not counted in the DL DAI. Thus, the UE may misunderstand that sub-frame B is used as the sub-frame of which the DL DAI is equal to 0. As a result, when the ACK/NAK associated with the SPS sub-frame is fixed at the first position in the multiplexing group, the UE feeds back a NAK, a NAK and an ACK, but the BS should receive the feedbacks NAK, ACK and NAK. As result, the feedbacks of the UE actually sends is different from that of the BS should receive.

This embodiment provides an improved solution for overcoming the weaknesses of the prior art, in which the ACK/NAK of the SPS sub-frames are fixed at the first position in the multiplexing group for feedback; and feedback errors occur when the override PDDCH signaling of the semi-persistent scheduling sub-frames is missing. The improved solution is as follows: When the assignment ratio of the uplink sub-frames to the downlink sub-frames is 1:3, four downlink sub-frames and one uplink sub-frame are available within the period of 5 ms if the DwPTS can carry downlink data. When the UL ACK/NAK multiplexing is performed on the uplink ACKs/NAKs associated with the SPS downlink sub-frames, the uplink ACK/NAK is fixed at the last position in N ACKs/NAKs for transmission; that is, the ACK/NAK is fixed at the third position. In this case, the BS should receive the feedbacks NAK, ACK and NAK. According to the fact that the DL DAI and UL DAI of sub-frame C are respectively equal to 1 and 3, the UE may misunderstand that sub-frame B is a dynamic scheduling sub-frame and feed back a NAK responding to sub-frame B, and that sub-frame A is an SPS sub-frame and feed back a NAK responding to sub-frame A at the last position in the UL ACK/NAK multiplexing group. The UL ACKs/NAKs of other sub-frames are arranged according to the sequence of the DL DAI. The UE actually feeds back a NAK, an ACK and a NAK. In this case, the sequence of feedbacks that the UE actually sends is the same as that of feedbacks that the BS should receive.

This embodiment places the ACK/NAK of semi-persistent scheduling data packet of the downlink data at the position of the third ACK/NAK for feedback. Thus, when the override PDCCH signaling of the semi-persistent scheduling sub-frames is missing, the UE cannot differentiate whether the sub-frames are dynamic scheduling sub-frames or semi-persistent scheduling sub-frames. If the ACK/NAK of the SPS data packet of the downlink data is placed at the position of the third ACK/NAK for feedback, the sequence of feedbacks that the UE actually sends is the same as that of feedbacks that the BS should receive. In addition, this embodiment takes only the assignment ratio of the uplink sub-frames is equal to 1:3 as an example. Other six assignment ratios are also applicable to the present invention, and will not be further described.

Figure 5:
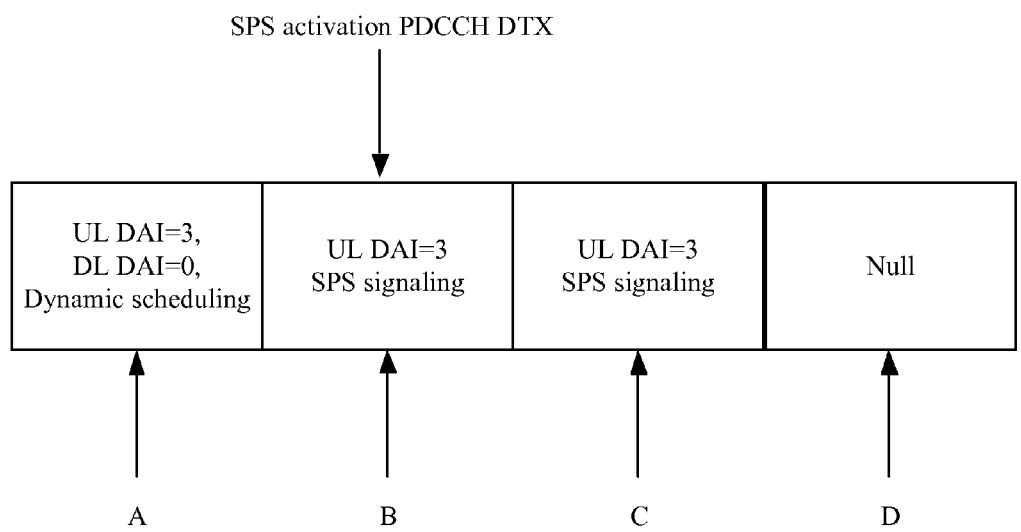
FIG. 5 is a schematic drawing illustrating the receiving of SPS sub-frames in a method for receiving ACK information of SPS data packets according to another embodiment of the present invention.

The embodiment shown in FIG. 3 is based on the fact that the SPS activation PDCCH of an SPS sub-frame is missing. However, the number of transmitted SPS sub-frames is not limited to 1 in this embodiment. This embodiment supposes there are two SPS sub-frames, among which the SPS activation PDCCH of one SPS sub-frame is missing, and the other SPS sub-frame is transmitted normally. FIG. 5 is a schematic drawing illustrating the receiving of SPS sub-frames in a method for receiving ACK information of SPS data packets in another embodiment of the present invention. As shown in FIG. 5, sub-frame B is the SPS sub-frame of which the SPS activation PDCCH is missing and sub-frame C is the SPS sub-frame that is normally transmitted without DL Grant. Errors may occur if the ACK/NAK of the SPS data packet of the downlink data is placed at the position of the first ACK/NAK for feedback. The specific analysis is as follows. The BS schedules three downlink sub-frames for the UE, and value of the UL DAI is equal to 3. Sub-frame A carries dynamic scheduling data. In this case, value of the DL DAI is equal to 0, and the UE receives the sub-frame and feeds back an ACK, that is, an ACK is fed back because of DL DAI=0. The UE does not receive PDCCH of the SPS activation sub-frame at the position of sub-frame B. Thus, the UE does not think that sub-frame B is an SPS sub-frame, but misunderstands that sub-frame B is a dynamic scheduling sub-frame.

As a result, the UE feeds back a NAK at the third position. Sub-frame C is an SPS sub-frame that is normally transmitted without DL Grant. The UE receives the sub-frame C and should feed back an ACK at the first position. In fact, the UE feeds back an ACK, an ACK and a NAK. The BS should receive the feedbacks NAK, ACK and ACK. In this case, the sequence of feedbacks that the UE actually sends is different from that of feedbacks that the BS should receive.

To solve this problem, this embodiment arranges the ACKs/NAKs associated with the SPS sub-frames behind the dynamic sub-frames in a certain sequence when the UL ACK/NAK multiplexing is performed on the uplink ACKs/NAKs associated with the SPS downlink sub-frames. According to this embodiment, value of the DL DAI of sub-frame A is equal to 0, and sub-frame A is a dynamic scheduling sub-frame which an ACK should be fed back, where the ACK should be placed at the position of the first ACK/NAK. Sub-frame B is an SPS sub-frame to which a NAK should be fed back; sub-frame C is an SPS sub-frame to which an ACK should be fed back at the position of the third ACK/NAK. The positions of ACKs/NAKs of the SPS sub-frames are arranged according to the arrival sequence of sub-frames B and C. The BS should receive the feedbacks ACK, NAK and ACK. According to the fact that values of the DL DAI and UL DAI of sub-frame A are respectively equal to 0 and 3, the UE may determine that sub-frame A is a dynamic scheduling sub-frame and feed back an ACK at the first position because value of the DL DAI is equal to 0. Because the PDCCH of sub-frame B is missing, the UE may misunderstand that sub-frame B is a dynamic scheduling sub-frame, and feed back a NAK at the second position of the UL ACK/NAK. Sub-frame C is an SPS sub-frame and is received correctly. In this case, an ACK is placed at the last position. In fact, the UE feeds back an ACK, a NAK and an ACK. In this case, the sequence of feedbacks that the UE actually sends is the same as that of feedbacks that the BS should receive.

This embodiment places respectively the ACKs/NAKs of two SPS data packets of the downlink data at the positions of the second and third ACKs/NAKs for feedback. Thus, when the SPS activation PDCCH signaling is missing, the UE cannot differentiate whether the sub-frames are dynamic scheduling sub-frames or SPS sub-frames. If the ACKs/NAKs of the SPS data packets of the downlink data are placed respectively at the positions of the second and third ACKs/NAKs for feedback, the three ACKs/NAKs can be arranged correctly. In addition, this embodiment takes only two SPS data packets as an example. More than two SPS data packets may also be applicable to the present invention. This embodiment is based on the condition that the SPS activation PDCCH signaling is missing. The following conditions are also applicable to the present invention: The SPS activation PDCCH signaling is missing and the normal SPS data packet is missing, which will not be further described. Furthermore, this embodiment takes only the assignment ratio of the uplink sub-frames is equal to 1:3 as an example. The other six assignment ratios are also applicable to the present invention, and will not be further described.

Figure 6:
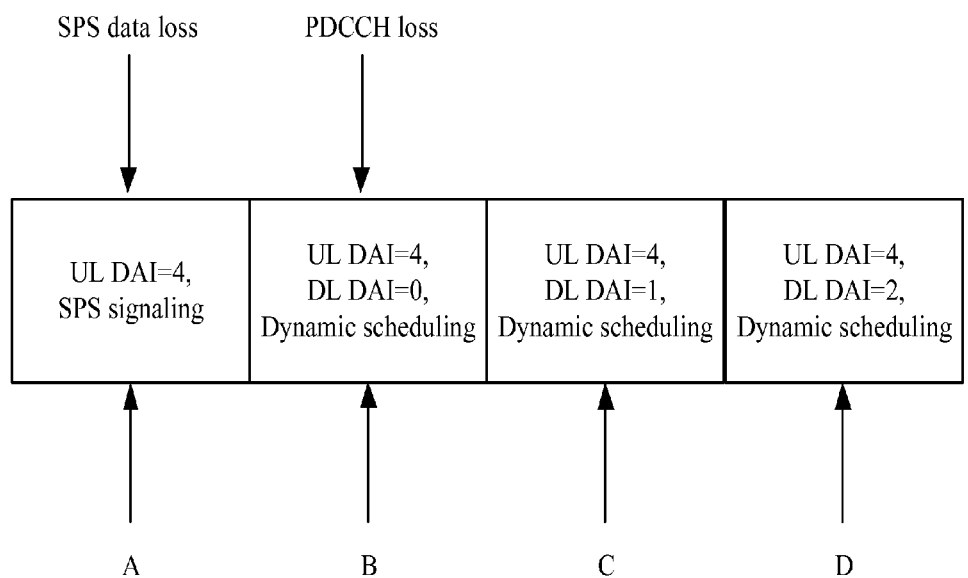
FIG. 6 is a schematic drawing illustrating the receiving of SPS sub-frames in a method for receiving ACK information of SPS data packets according to another embodiment of the present invention.

The preceding embodiments are based on the condition that the BS schedules three downlink sub-frames for the UE. The method for receiving ACK information of SPS data packets in another embodiment of the present invention is based on the following conditions: The assignment ratio of uplink sub-frames to downlink sub-frames is 1:3; four downlink sub-frames are available within the period of 5 ms; the BS schedules four downlink sub-frames for the UE; and when the semi-persistent transmission begins, the transmission of SPS sub-frame data packets fails and the PDCCHs of dynamic sub-frames are missing. FIG. 6 is a schematic drawing illustrating the receiving of SPS sub-frames in a method for receiving ACK information of SPS data packets in another embodiment of the present invention. As shown in FIG. 6, if the DwPTS can carry downlink data, four downlink sub-frames and one uplink sub-frame are available within the period of 5 ms. When the semi-persistent transmission begins, the UE receives semi-persistent transmission data sub-frames at a fixed time within a certain period if the transmission of SPS sub-frame A fails and the PDCCH of dynamic sub-frame B is missing. When the UL ACK/NAK multiplexing is performed on the uplink ACKs/NAKs associated with the SPS downlink sub-frames, the uplink ACK/NAK is fixed at the last position in the multiplexing group for transmission. The UE knows that sub-frame A is an SPS sub-frame and detects that sub-frame A data is missing. Then, the UE feeds back a NAK. The UE does not detect any PDCCH in sub-frame B. The UE detects data in sub-frame C, and deduces that sub-frame B loses a dynamic data scheduling sub-frame according to the fact that the value of the DL DAI is equal to 1. The UE detects that sub-frame D is correct and has a feedback ACK. Because the value of the UL DAI is equal to 4, the UE needs to feed back four ACKs/NAKs. According to the arrangement sequence of the DL DAI and the method for placing SPS sub-frames at the last position, the UE gives feedbacks as follows: NAK, ACK, ACK, and NAK. Further, the BS should receive the feedbacks NAK, ACK, ACK and NAK. Thus, the sequence of feedbacks that the UE actually sends is the same as that of feedbacks that the BS should receive.

Figure 7:
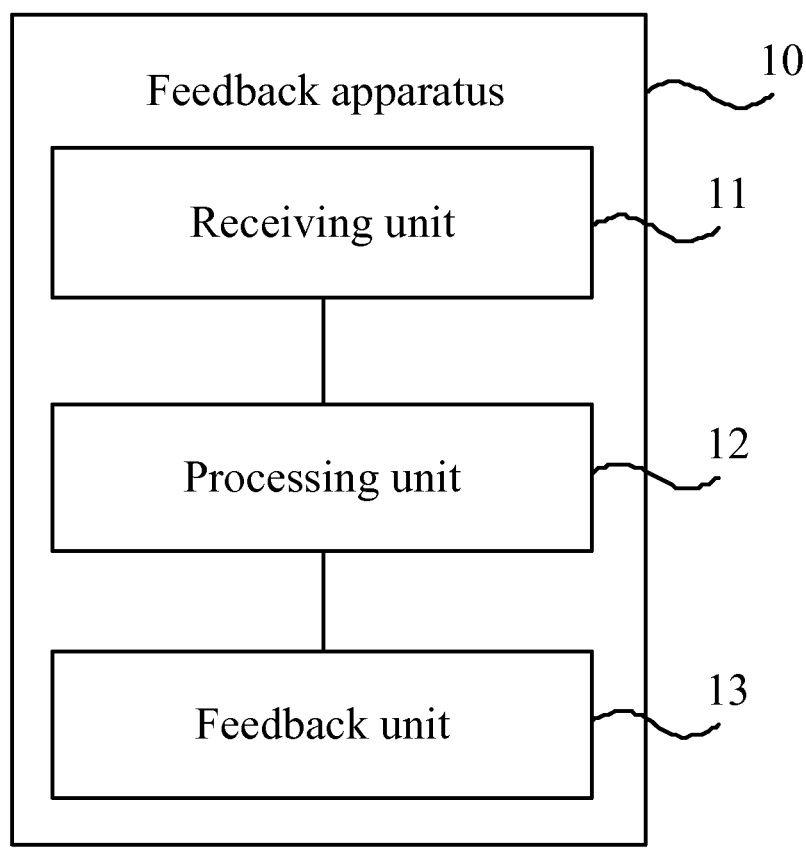
FIG. 7 shows a structure of an apparatus for feeding back ACK information of SPS data packets according to an embodiment of the present invention.

FIG. 7 shows a structure of an apparatus for feeding back ACK information of SPS data packets in an embodiment of the present invention. As shown in FIG. 7, the feedback apparatus 10 includes: a receiving unit 11 configured to receive downlink data and an uplink data assignment indicator (UL DAI) from a base station (BS), where a value of the UL DAI indicates a number (N) of the downlink data packets; a processing unit 12 configured to place the ACKs/NAKs of k SPS data packets of the downlink data packets at positions from a $(N-k+1)^{th}$ ACK/NAK to a $N^{th}$ ACK/NAK; and a feedback unit 13 configured to feed back N ACKs/NAKs to the BS. The processing unit 12 is further configured to place ACKs/NAKs of non-SPS data packets of the downlink data packets at positions from a first ACK/NAK among the N ACKs/NAKs. The process includes receiving a downlink data assignment indicator (DL DAI) from the BS, where a value of the DL DAI indicates that the downlink data packet is an $M^{th}$ non-SPS downlink data packet; and placing the ACK/NAK of the $M^{th}$ non-SPS data packet at a position of an $M^{th}$ ACK/NAK.

In addition, the processing unit 12 may place the ACKs/NAKs of the k SPS data packets of the downlink data packets at the positions from the $(N-k+1)^{th}$ ACK/NAK to the Nth ACK/NAK in positive or negative sequence. The details are given in the third to sixth embodiments of the present invention, and will not be further provided.

This embodiment places the ACKs/NAKs of the k SPS data packets of the downlink data at the positions from the $(N-k+1)^{th}$ ACK/NAK to the $N^{th}$ ACK/NAK. In this case, when the SPS activation PDCCH signaling or the override PDCCH signaling of the SPS sub-frames is missing, the UE cannot differentiate whether the sub-frames are dynamic scheduling sub-frames or SPS sub-frames. If the ACKs/NAKs of k SPS data packets of the downlink data are placed to positions from the $(N-k+1)^{th}$ ACK/NAK to the $N^{th}$ ACK/NAK, N ACKs/NAKs can be arranged correctly.

Figure 8:
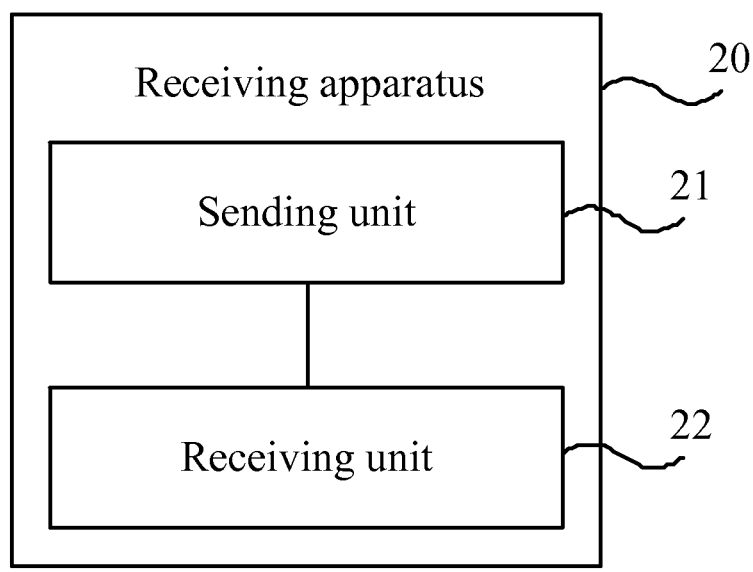
FIG. 8 shows a structure of an apparatus for receiving ACK information of SPS data packets according to an embodiment of the present invention.

FIG. 8 shows a structure of an apparatus for receiving ACK information of SPS data packets in an embodiment of the present invention. As shown in FIG. 8, the receiving apparatus 20 includes: a sending unit 21 configured to send downlink data and an uplink data assignment indicator (UL DAI) to a user equipment (UE), where a value of the UL DAI indicates a number (N) of the downlink data packets; and a receiving unit 22 configured to receive N ACKs/NAKs fed back by the UE, among which positions from a $(N-k+1)^{th}$ ACK/NAK to a $N^{th}$ ACK/NAK are used for placing k SPS data packets of the downlink data packets. When the receiving unit 22 receives a feedback NAK to an SPS activation sub-frame, the sending unit 21 is further configured to transmit another SPS activation signaling at a next time of semi-persistent transmission, or transmit another SPS activation signaling at time of SPS retransmission, where the retransmitted signaling is the same as or different from the SPS activation signaling. In addition, the ACKs/NAKs of the non-SPS data packets of the downlink data packets are placed at positions from a first position of the N ACKs/NAKs in the receiving unit 22. The process includes sending a downlink data assignment indicator (DL DAI) to the UE, where a value of DL DAI indicates that the downlink data packet is a $M^{th}$ non-SPS downlink data packet; and receiving M ACKs/NAKs fed back by the UE, among which the $M^{th}$ non-SPS data packet is placed at the position of a $M^{th}$ ACK/NAK. The details are given in the preceding method embodiments.

Embodiments of the present invention place the ACKs/NAKs of k SPS data packets of the downlink data packets to positions from the $(N-k+1)^{th}$ ACK/NAK to the $N^{th}$ ACK/NAK. In this case, when the SPS activation PDCCH signaling or the override PDCCH signaling of the SPS sub-frames is missing, the UE cannot differentiate whether the sub-frames are dynamic scheduling sub-frames or SPS sub-frames. If the ACKs/NAKs of the k SPS data packets of the downlink data packets are placed at the positions from the $(N-k+1)^{th}$ ACK/NAK to the Nth ACK/NAK, N ACKs/NAKs can be arranged correctly. Thus, when the BS receives ACK information of the N ACKs/NAKs that are arranged correctly, unnecessary data retransmissions may be reduced, thus saving resources.

Through the preceding description of embodiments, it is understandable to those skilled in the art that embodiments of the present invention may be implemented by hardware or software in combination with a necessary hardware platform. Thus, the technical solution of the present invention may be made into software. The software may be stored in a non-volatile storage medium (for example, a CD-ROM, a USB flash disk, and a mobile hard disk), and include several instructions that enable a computer device (PC, server, or network device) to perform the methods provided in each embodiment of the present invention.

Although the present invention has been described through some exemplary embodiments and accompanying drawings, the invention is not limited to such embodiments. It is apparent that those skilled in the art can make various modifications and variations to the invention without departing from the spirit and scope of the invention.

What is claimed is:

1. A method for a user equipment (UE) to feed back acknowledgement information of semi-persistent scheduling (SPS) data packets, comprising:
   receiving downlink data packets and an uplink data assignment indicator (UL DAI) from a base station (BS), wherein a value of the UL DAI indicates a number (N) of physical downlink shared channel (PDSCH) data packets which are scheduled by the BS for the UE, the number N is greater than 1, a number k (0<k<N) of the PDSCH data packets is/are SPS data packets, and wherein k and N are positive integers;
   forming a feedback signal comprising N acknowledgements/negative acknowledgements (ACKs/NAKs) acknowledging the N PDSCH data packets, wherein k ACKs/NAKs of the k SPS data packets is/are placed from the (N−k+1)th to the Nth positions of the N ACKs/NAKs; and
   sending the feedback signal to the BS starting from the ACK/NAK at the first position.

2. The method of claim 1, further comprising:
   placing N−k ACKs/NAKs of non-SPS data packets of the N PDSCH data packets from the first position to the (N−k)th position of the N ACKs/NAKs.

3. The method of claim 2, further comprising:
   receiving a downlink data assignment indicator (DL DAI) from the BS, wherein a value of the DL DAI indicates that a PDSCH data packet is an Mth non-SPS data packet of the N PDSCH data packets (M≤N−k); and wherein an ACK/NAK of the Mth non-SPS data packet is placed at a Mth position of the N ACKs/NAKs.

4. The method of claim 1, wherein a SPS data packet is a data packet without a resource scheduling index, and a non-SPS data packet is a data packet with a resource scheduling index.

5. The method of claim 1, wherein k=1.

6. The method of claim 1, wherein the positions from the (N−k+1)th ACK/NAK to the Nth ACK/NAK are used for arranging the acknowledgement of the k SPS data packets of the N PDSCH data packets in a positive sequence or a negative sequence or according to an arrival sequence of the SPS data packets.

7. A user equipment (UE), comprising:
   a receiver, configured to receive downlink data packets and an uplink data assignment indicator (UL DAI) from a base station (BS), wherein a value of the UL DAI indicates a number (N) of physical downlink shared channel (PDSCH) data packets which are scheduled by the BS for the UE, the number N is greater than 1, a number k (0<k<N) of the downlink data packets is/are semi-persistent scheduling (SPS) data packets, and wherein k and N are positive integers;
   a processor, configured to form a feedback signal comprising N acknowledgements/negative acknowledgements (ACKs/NAKs) acknowledging the N PDSCH data packets, wherein k ACKs/NAKs of the k SPS data packets is/are placed from the (N−k+1)th to the Nth positions of the N ACKs/NAKs; and
   a transmitter, configured to send the feedback signal to the BS starting from the ACK/NAK at the first position.

8. The UE of claim 7, wherein the processor is further configured to place N−k ACKs/NAKs of the N−k non-SPS data packets of the N PDSCH data packets from the first position to the (N−k)th position of the N ACKs/NAKs.

9. The UE of claim 8, wherein the receiver is further configured to receive a downlink data assignment indicator (DL DAI) from the BS, wherein a value of the DL DAI indicates that a downlink data packet is an Mth non-SPS data packet of the N PDSCH data packets (M≤N−k); wherein an ACK/NAK of the Mth non-SPS data packet is placed at an Mth position of the N ACKs/NAKs.

10. The UE of claim 7, wherein a SPS data packet is a data packet without a resource scheduling index, and a non-SPS data packet is a data packet with a resource scheduling index.

11. The UE of claim 7, wherein k=1.

12. The UE of claim 7, wherein the positions from the (N−k+1)th ACK/NAK to the Nth ACK/NAK are used for arranging the acknowledgement of the k SPS data packets of the N PDSCH data packets in a positive sequence or a negative sequence or according to an arrival sequence of the SPS data packets.

13. A method for a base station (BS) to receive acknowledgement information of semi-persistent scheduling (SPS) data packets, comprising:
   sending downlink data packets and an uplink data assignment indicator (UL DAI) to a user equipment (UE), wherein a value of the UL DAI indicates a number (N) of physical downlink shared channel (PDSCH) data packets which are scheduled by the BS for the UE, the number N is larger than 1, a number k (0<k<N) of the PDSCH data packets is/are SPS data packets, and wherein k and N are positive integers; and
   receiving from the UE N acknowledgements/negative acknowledgements (ACKs/NAKs) starting from the first ACK/NAK at the first position, wherein k ACKs/NAKs of the k SPS data packets is/are placed from the (N−k+1)th to the Nth positions of the N ACKs/NAKs.

14. The method of claim 13, further comprising:
   transmitting a SPS activation signaling; and
   transmitting, if receiving a feedback NAK, another SPS activation signaling at a next time of semi-persistent transmission, or transmitting another SPS activation signaling at a time of SPS retransmission, wherein the another SPS activation signaling is the same as or different from the SPS activation signaling.

15. The method of claim 13, wherein N−k ACKs/NAKs of non-SPS data packets of the N PDSCH data packets is/are placed from the first position to the (N−k)th position of the N ACKs/NAKs.

16. The method of claim 15, further comprising:
   sending a downlink data assignment indicator (DL DAI) to the UE, wherein a value of the DL DAI indicates that a PDSCH data packet is a Mth non-SPS data packet of the N PDSCH data packets (M≤N−k); wherein the received feedback signal comprises N−k ACK/NAKs of the non- SPS data packets, and an acknowledgement of the Mth non-SPS data packet is placed at the Mth position of the N ACKs/NAKs.

17. The method of claim 13, wherein k=1.

18. The method of claim 13, wherein the positions from the (N−k+1)th ACK/NAK to the Nth ACK/NAK are used for arranging the acknowledgement of the k SPS data packets of the N PDSCH data packets in a positive sequence or a negative sequence or according to an arrival sequence of the SPS data packets.

19. A base station, comprising:
a transmitter, configured to send downlink data packets and an uplink data assignment indicator (UL DAI) to a user equipment (UE), wherein a value of the UL DAI indicates a number (N) of physical downlink shared channel (PDSCH) data packets which are scheduled by the BS for the UE, the number N is larger than one, a number k (0<k<N) of the N PDSCH data packets is/are semi-persistent scheduling (SPS) data packets, and wherein k and N are positive integers; and
a receiver, configured to receive from the UE N acknowledgements/negative acknowledgements (ACKs/NAKs) starting from the first ACK/NAK at the first position, wherein k ACKs/NAKs of the k SPS data packets is/are placed from the (N−k+1)th to the Nth positions of the N ACKs/NAKs.

20. The base station of claim 19, wherein the transmitter is further configured to transmit a SPS activation signaling, and, when the receiver receives a feedback NAK, transmit another SPS activation signaling at a next time of semi-persistent transmission, or transmit another SPS activation signaling at a time of SPS retransmission, wherein the another SPS activation signaling is the same as or different from the SPS activation signaling.

21. The base station of claim 19, wherein N−k ACKs/NAKs of non-SPS data packets of the N PDSCH data packets is/are placed from the first position to the (N−k)th position of the N ACKs/NAKs.

22. The base station of claim 21, wherein the transmitter is further configured to send a downlink data assignment indicator (DL DAI) to the UE, wherein a value of the DL DAI indicates that a PDSCH data packet is a Mth non-SPS data packet of the downlink data packets (M≤N−k); and wherein the received feedback signal comprises N−k ACK/NAKs of the non-SPS data packets, an acknowledgement of the Mth non-SPS data packet is placed at the Mth position of the N ACKs/NAKs.

23. The base station of claim 19, wherein k=1.

24. The base station of claim 19, wherein the positions from the (N−k+1)th ACK/NAK to the Nth ACK/NAK are used for arranging the acknowledgement of the k SPS data packets of the downlink data packets in a positive sequence or a negative sequence or according to an arrival sequence of the SPS data packets.

25. A computer program product comprising a non-transitory storage medium having stored thereon a computer program for use by a user equipment (UE), wherein the program comprises:
instructions for receiving downlink data packets and an uplink data assignment indicator (UL DAI) from a base station (BS), wherein a value of the UL DAI indicates a number (N) of physical downlink shared channel (PDSCH) data packets which are scheduled by the BS for the UE, the number N is greater than 1, a number k (0<k<N) of the N PDSCH data packets is/are semi-persistent scheduling (SPS) data packets, and wherein k and N are positive integers;
instructions for forming a feedback signal comprising N acknowledgements/negative acknowledgements (ACKs/NAKs) acknowledging the N downlink data packets, wherein k ACKs/NAKs of the k SPS data packets is/are placed from the (N−k+1)th to the Nth positions of the N ACKs/NAKs; and
instructions for sending the feedback signal to the BS starting from the ACK/NAK at the first position.

26. The computer program product of claim 25, wherein k=1.

27. The computer program product of claim 25, wherein N−k ACKs/NAKs of non-SPS data packets of the N PDSCH data packets is/are placed from the first position to the (N−k)th position of the N ACKs/NAKs.

28. A computer program product comprising a non-transitory storage medium having stored thereon a computer program for use by a base station (BS), wherein the program comprises:
instructions for sending downlink data packets and an uplink data assignment indicator (UL DAI) to a user equipment (UE), wherein a value of the UL DAI indicates a number (N) of physical downlink shared channel (PDSCH) data packets which are scheduled by the BS for the UE, the number N is larger than 1, wherein a number k (0<k<N) of the PDSCH data packets is/are semi-persistent scheduling (SPS) data packets, and wherein k and N are positive integers; and
instructions for receiving from the UE a feedback signal comprising N acknowledgements/negative acknowledgements (ACKs/NAKs) starting from the first ACK/NAK at the first position, wherein k ACKs/NAKs of the k SPS data packets is/are placed from the (N−k+1)th to the Nth positions of the N ACKs/NAKs.

29. The computer program product of claim 28, wherein k=1.

30. The computer program product of claim 28, wherein N−k ACKs/NAKs of non-SPS data packets of the N PDSCH data packets is/are placed from the first position to the (N−k)th position of the N ACKs/NAKs.

* * * * *